(12) United States Patent
Kunito et al.

(10) Patent No.: US 6,246,499 B1
(45) Date of Patent: Jun. 12, 2001

(54) OPTICAL SIGNAL COMMUNICATION APPARATUS AND OPTICAL SIGNAL COMMUNICATION METHOD

(75) Inventors: Yoshiyuki Kunito; Hideki Yoshida, both of Kanagawa; Tatsuo Inoue; Yoichi Toriumi, both of Tokyo; Michihiko Sakurai, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/890,626

(22) Filed: Jul. 9, 1997

(30) Foreign Application Priority Data

Jul. 19, 1996 (JP) .................................................. 8-190380

(51) Int. Cl.⁷ .................................................. H04B 10/00
(52) U.S. Cl. .......................... 359/161; 359/152; 359/173
(58) Field of Search .................................. 359/143, 152, 359/153, 161, 166, 173, 187; 455/69

(56) References Cited

U.S. PATENT DOCUMENTS

| | | | |
|---|---|---|---|
| 4,553,268 | * 11/1985 | Tilly | 359/152 |
| 4,777,653 | * 10/1988 | Bonnerot et al. | 455/69 |
| 5,485,300 | * 1/1996 | Daley | 359/187 |
| 5,623,355 | * 4/1997 | Olsen | 359/187 |
| 5,706,112 | * 1/1998 | Morita et al. | 359/187 |
| 5,801,860 | * 9/1998 | Yoneyama | 359/187 |
| 5,812,295 | * 9/1998 | Kitasagami | 359/167 |
| 5,822,099 | * 10/1998 | Takamatsu | 359/187 |

FOREIGN PATENT DOCUMENTS 2 219 165    11/1989   (GB) .

* cited by examiner

Primary Examiner—Kinfe-Michael Negash
(74) Attorney, Agent, or Firm—Sonnenschein, Nath & Rosenthal

(57) ABSTRACT

To be able to receive a laser beam having a predetermined intensity even if lengths of optical fibers differ, a laser beam transmitted from a counterpart of communication is received by a photodiode, an electric signal produced thereby is amplified by an amplifying unit and thereafter, a peak value of the signal is detected by a peak hold unit, a differential amplifying unit calculates a difference between an output signal from the peak hold unit and a reference level (Rx. Ref), forms a control signal based on the difference and outputs it to APC via a selector, APC controls an LD drive unit in accordance with an output from a photodiode where a portion of a laser beam emitted from LD is incident and the signal outputted from the differential amplifying unit, and the LD drive unit amplifies transmitted data (Tx. Data) in accordance with a signal outputted from APC thereby driving LD.

10 Claims, 8 Drawing Sheets

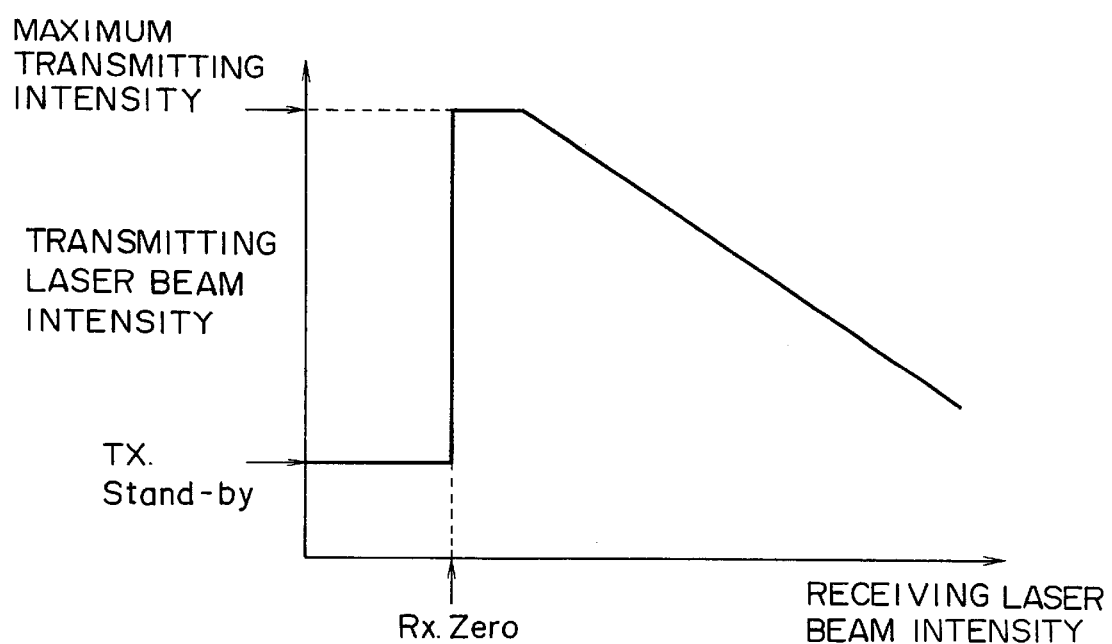
F I G. 3

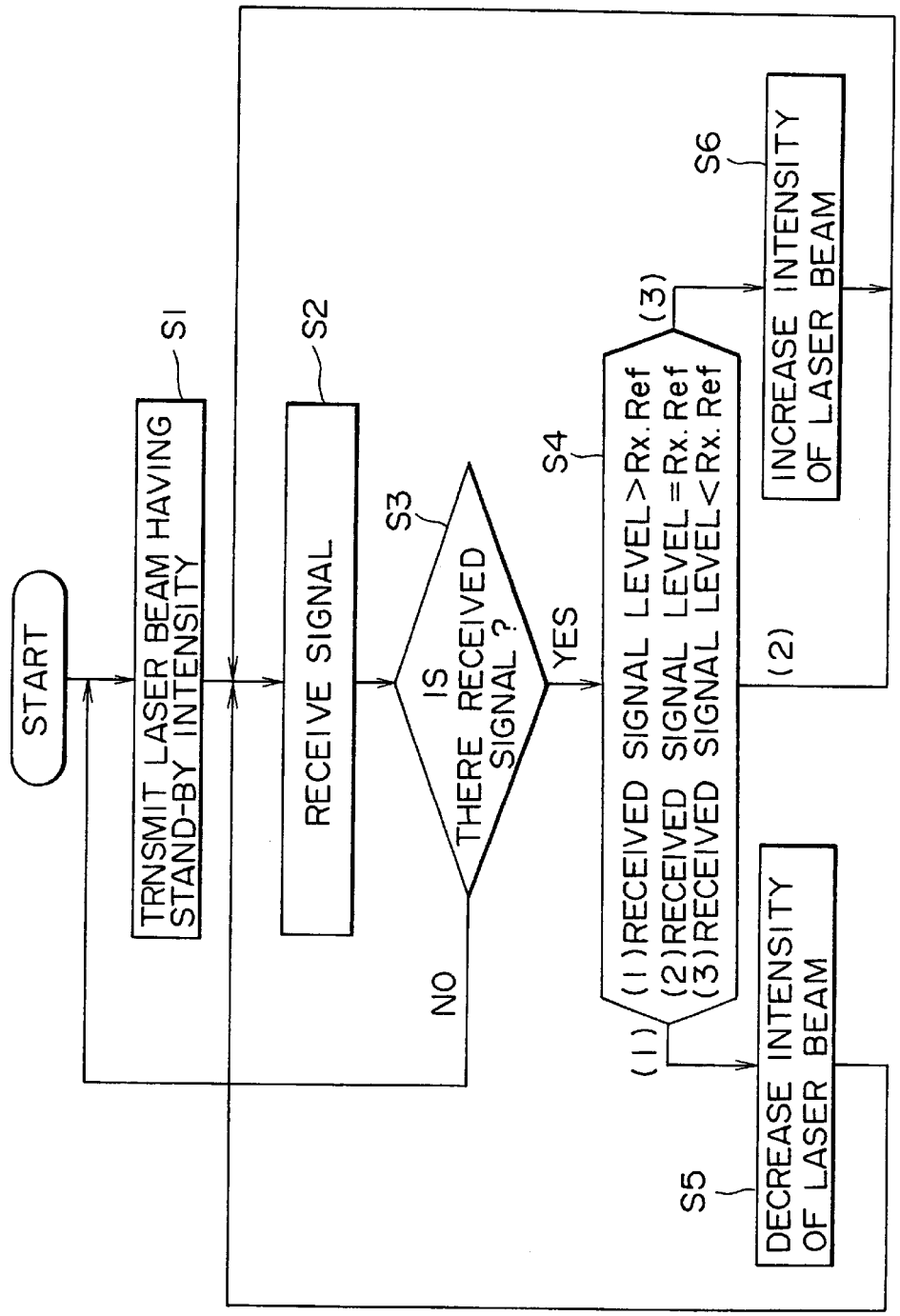

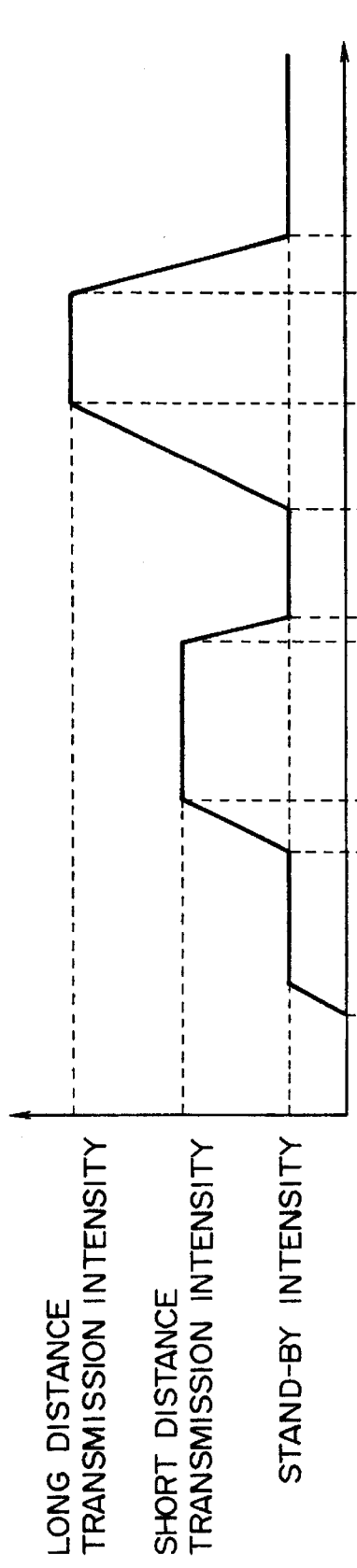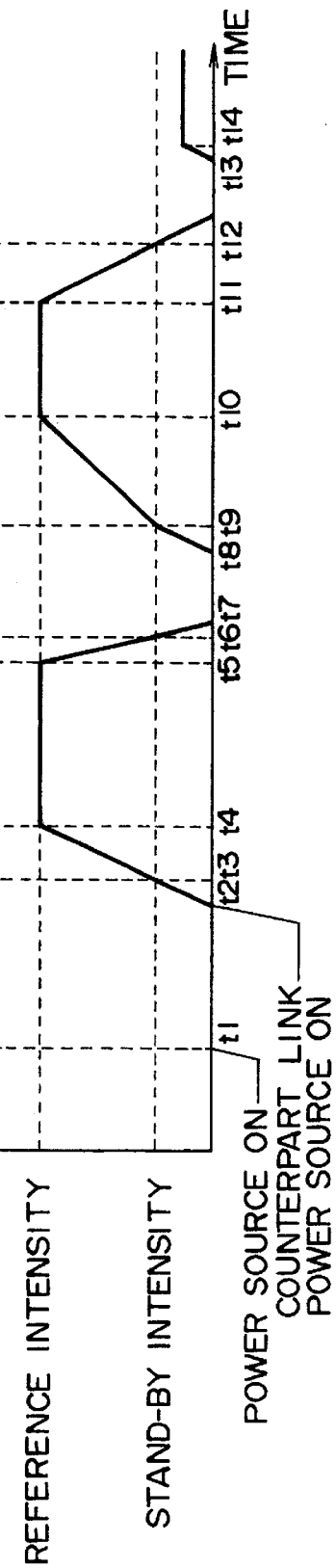

F I G. 6
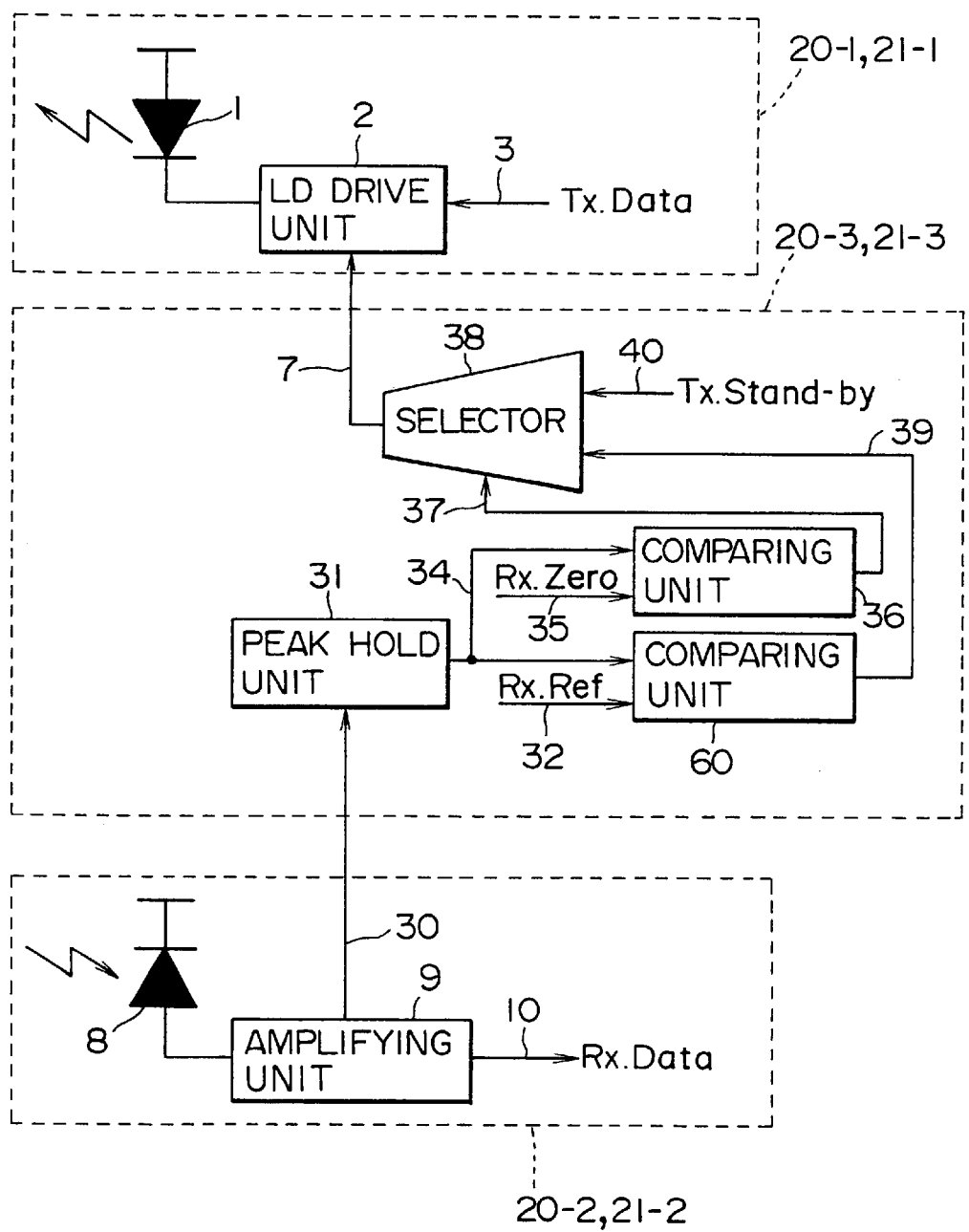

OPTICAL SIGNAL COMMUNICATION APPARATUS AND OPTICAL SIGNAL COMMUNICATION METHOD

BACKGROUND OF THE INVENTION

1. Field of the Invention

The present invention relates to an optical communication apparatus and an optical communication method, particularly to an optical communication apparatus and an optical communication method for transmitting and receiving information by a light beam emitted by a laser diode, an LED (Light Emitting Diode) or the like with optical fiber as a transmitting medium.

2. Description of Related Art

FIG. 8 is a block diagram for explaining an example of the constitution of a conventional optical communication apparatus. A laser diode (hereinafter, abbreviated as LD) 1 converts an electric signal into a laser beam having a corresponding intensity and transmits it via an optical fiber, not illustrated. Further, an LD drive unit 2 drives LD 1 in response to transmitted data (Tx. Data) inputted from a signal line 3 and an output signal from APC (Auto Power Control) 5. A portion of the laser beam emitted from LD 1 is incident on a photodiode 4 where the portion is converted into a corresponding electric signal.

APC 5 controls the LD drive unit 2 in response to the electric signal outputted from the photodiode 4 and a reference level (Tx. Ref) of the transmitted signal inputted via a signal line 6 such that the intensity of the laser beam emitted from LD 1 becomes a predetermined level. A laser beam transmitted via an optical fiber, not illustrated, is incident on a photodiode 8 and the photodiode 8 converts the transmitted laser beam into a corresponding electric signal. An amplifying unit 9 amplifies the electric signal outputted from the photodiode 8 with a predetermined gain and outputs the amplified electric signal as received data (Rx. Data) via a signal line 10.

Next, an explanation will be given of the operation of the conventional example.

The transmitted data is supplied to the LD drive unit 2 via the signal line 3. The LD drive unit 2 drives LD 1 in response to the transmitted data and the output signal from APC 5 whereby a laser beam is emitted. The laser beam emitted from LD 1 is transmitted to a counter side of communication, not illustrated, via an optical fiber, not illustrated.

A portion of the laser beam emitted from LD 1 is incident on the photodiode 4 and accordingly, an electric signal in correspondence with the intensity of the laser beam emitted from LD 1 is inputted to APC 5. APC 5 compares the electric signal outputted from the photodiode 4 with the reference level (Tx. Ref) of the transmitted signal inputted from the signal line 6 and controls the LD drive unit 2 such that a predetermined relationship is maintained therebetween (for example, the both are provided with the same value). As a result, the intensity of the laser beam emitted from LD 1 is always set to a predetermined level.

Further, the laser beam transmitted via an optical fiber, not illustrated, is photoelectrically converted into a corresponding electric signal by the photodiode 8 and amplified by the amplifying unit 9 with a predetermined gain and thereafter, the electric signal is outputted as received data via the signal line 10.

According to such a conventional optical communication apparatus, the intensity of the transmitted laser beam is always set to a predetermined level. The intensity of the laser beam is generally set with a transmission loss of a longest optical fiber in the system (system constituted by mutually connecting optical communication apparatuses) as a reference.

That is, when the laser beam is set to have an intensity capable of sufficiently dealing with the transmission loss at a longest optical fiber in the system, a sufficient intensity can be provided in all of portions of the system.

However, it is said that the life of a laser diode (LD) is inversely proportional to a square (a cube) of the intensity of an emitted laser beam. Therefore, when the intensity of the laser beam is set in compliance with a longest optical fiber in the system, the intensity becomes excessively large at other portions of the system and as a result, the life of LD is considerably shortened as a whole in the system.

Further, when there is a large variational width in respective transmission losses of optical fibers mutually connecting optical communication apparatuses constituting a system (when respective lengths of optical fibers differ considerably), a large variational width is similarly provided to intensities of laser beams inputted to receiving units of optical communication apparatuses. For example, in the case of LAN (Local Area Network) or the like, there is a large variational width substantially ranging from 1 m to 100 m in respect of lengths of optical fibers used and accordingly, a difference in transmission loss amounts to substantially 16 dB whereby a large variational difference is given to intensities of laser beams in correspondence thereto. Further, such a difference is especially significant in POF (Plastic Optical Fiber) having a large internal loss.

When there is such a large variational width in the intensities of inputted laser beams, in order to secure a constant error rate in respect to inputs of laser beams at any intensities, the dynamic ranges of the optical communication apparatuses need to be secured sufficiently widely and as a result, the design of the apparatuses becomes complicated and the fabrication cost of the apparatuses is increased.

Furthermore, when the problem of Eye Safe is considered, it is preferable to set the intensity of a laser beam as small as possible. However, when the intensity of a laser beam is set to a low value, according to a system having a large loss (for example, a system connected by POF or the like), the system conflicts with the problem of the dynamic range as described above which makes difficult the design of the system.

Hence, there is known a method (OFC; Optical Fiber Control) clearing the problem of Eye Safe in which when optical fibers are not connected to optical communication apparatuses, the nonconnected state is detected and laser beams are outputted intermittently by which an average value of the intensity over time is lowered.

However, according to such a method, a circuit for detecting the nonconnected state of an optical fiber and a circuit for outputting a laser beam intermittently are further needed whereby the cost of apparatus is increased.

The present invention has been carried out in view of the above-described situation whereby the design of an optical communication apparatus can be simplified, the fabrication cost can be reduced and the life of apparatus can be extended.

Further, according to the present invention, an optical communication apparatus can be operated stably and the problem of Eye Safe can be cleared even if the optical communication apparatus is used under any environment.

SUMMARY OF THE INVENTION

According to a first aspect of the present invention, there is provided an optical signal communication apparatus including a transmitter for transmitting a signal via a transmitting medium to other communication apparatus, a receiver for receiving a signal transmitted via the transmitting medium from the other communication apparatus, a signal level detector for detecting a signal level of the signal received by the receiver, and a signal level controller for controlling a signal level of the signal transmitted by the transmitter in response to the signal level detected by the signal level detector.

According to a second aspect of the present invention, there is provided an optical signal communication method including the steps of transmitting a signal via a transmitting medium to other communication apparatus, receiving a signal transmitted via the transmitting medium from the other communication apparatus, detecting a signal level of the signal received by the receiving step, and controlling a signal level of the signal transmitted by the transmitting step in response to the signal level detected by the detecting step.

According to the first aspect of the optical communication apparatus, the transmitter transmits the signal to the other communication apparatus via the transmitting medium, the receiver receives the signal transmitted via the transmitting medium from the other communication apparatus, the signal level detector detects the signal level of the signal received by the receiver and the signal level controller controls the signal level of the signal transmitted by the transmitter in response to the signal level detected by the signal level detector. For example, the transmitter transmits a laser beam to the other optical communication apparatus via an optical fiber and the receiver receives a laser beam transmitted from the other optical communication apparatus. The signal level detector detects the intensity of the laser beam detected by the receiver and the signal level controller controls the intensity of the laser beam transmitted by the transmitter in response to the detected intensity.

According to the optical communication method in accordance with the second aspect of the present invention, the signal is transmitted to the other optical communication apparatus via the transmitting medium at the transmitting step, the signal transmitted via the transmitting medium from the other optical communication apparatus is received at the receiving step, the signal level of the received signal at the receiving step is detected at the signal level detecting step and the signal level of the signal transmitted at the transmitting step is controlled at the signal level controlling step in response to the signal level detected at the signal level detecting step. For example, a laser beam is transmitted to the other optical communication apparatus via an optical fiber at the transmitting step and a laser beam transmitted from the other optical communication apparatus is received at the receiving step. The intensity of the laser beam detected at the receiving step is detected at the signal level detecting step and the intensity of the laser beam transmitted at the transmitting step is controlled at the signal level controlling step in response to the detected intensity.

BRIEF DESCRIPTION OF THE DRAWINGS

FIG. 3 is a diagram showing a relationship between intensities of laser beams which are transmitted and received to and from the optical communication apparatus shown by FIG. 2;

FIG. 4 is a flowchart for explaining an example of processings when a power source is turned on in the optical communication apparatus shown by FIG. 2;

FIGS. 5A and 5B are diagrams showing time-sequential procedures of laser beams which are transmitted and received when optical fibers having various lengths are connected to the optical communication apparatus shown by FIG. 2;

FIG. 6 is a block diagram showing an example of other electric constitution of an optical communication apparatus to which the present invention is applied;

DETAILED DESCRIPTION OF THE PREFERRED EMBODIMENTS

Figure 1:
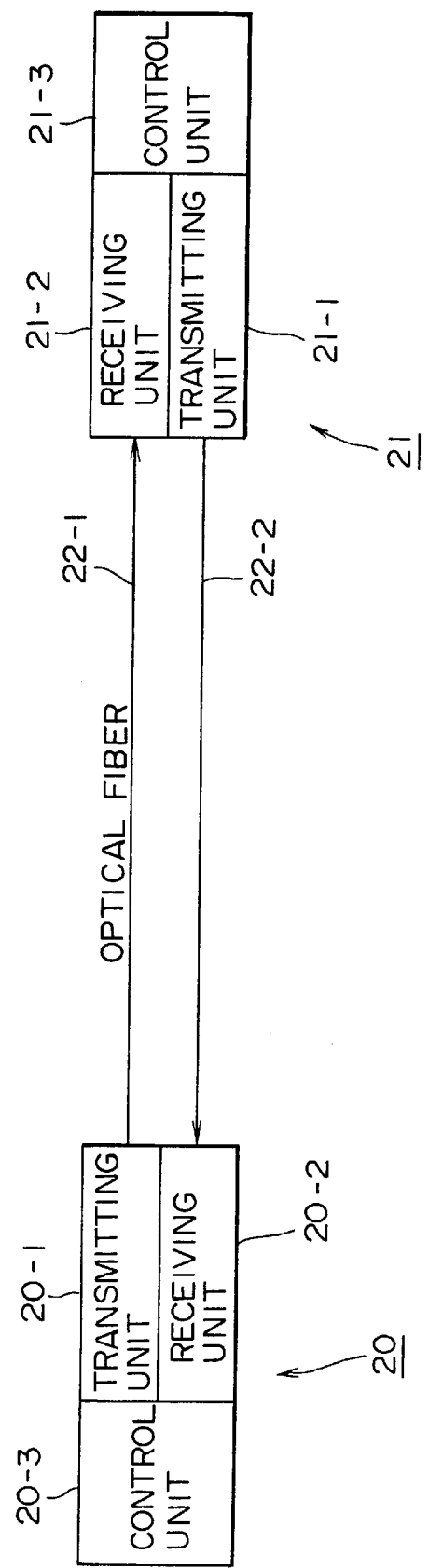
FIG. 1 is a view showing an example of the constitution of an optical communication system to which the present invention is applied.

FIG. 1 is a view showing an example of the constitution of optical communication apparatuses to which the present invention is applied. As shown by FIG. 1, optical communication apparatuses 20 and 21 are respectively constituted by transmitting units 20-1 and 21-1, receiving units 20-2 and 21-2 and control units 20-3 and 21-3. The transmitting unit 20-1 and the receiving unit 21-2, and the receiving unit 20-2 and the transmitting unit 21-1 are respectively connected by optical fibers 22-1 and 22-2.

The transmitting unit 20-1 modulates a laser beam in response to information intended to transmit and transmits the laser beam via the optical fiber 22-1 to the receiving unit 21-2. Similarly, the transmitting unit 21-1 transmits a laser beam modulated in response to information via the optical fiber 22-2 to the receiving unit 20-2.

The control units 20-3 and 21-3 control the intensities of laser beams outputted from the transmitting units 20-1 and 21-1 in reference to the intensities of the laser beams received by the receiving units 20-2 and 21-2.

Incidentally, the lengths of the optical fibers 22-1 and 22-2 are equal to each other since they are aggregated together in one cable. Also, when the optical fibers 22-1 and 22-2 are connected to the optical communication apparatuses 20 and 21, they are simultaneously connected to the transmitting units or the receiving units.

Figure 2:
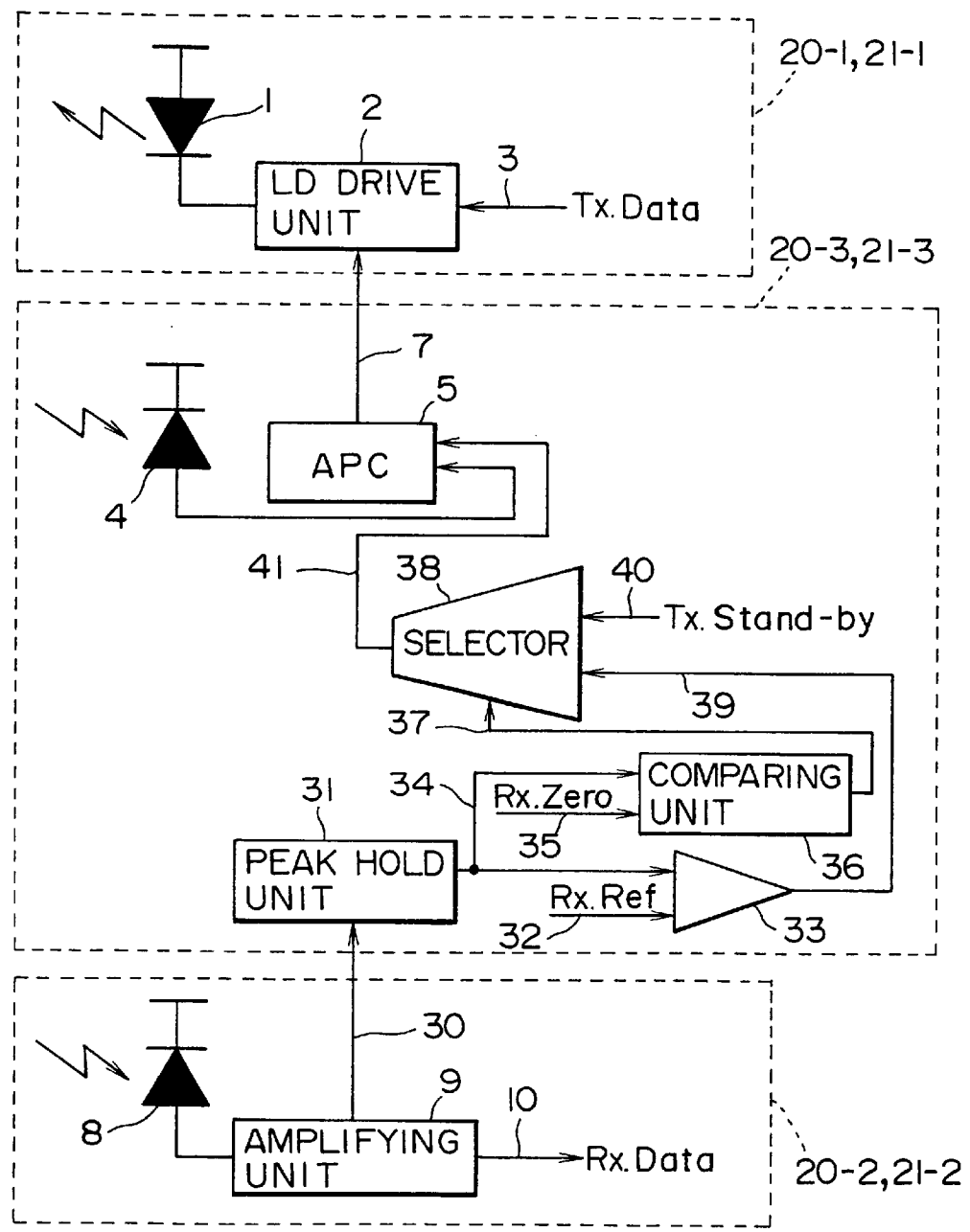
FIG. 2 is a block diagram showing an example of the electric constitution of optical communication apparatuses 20 and 21 shown by FIG. 1.

FIG. 2 is a block diagram showing an example of the electric constitution of the optical communication apparatuses 20 and 21 shown by FIG. 1.

As shown by FIG. 2, each of the transmitting units 20-1 and 21-1 shown by FIG. 1 is constituted by LD 1 (transmitting means, transmitting step) and an LD drive unit 2 (signal level controlling means, signal level controlling step). Each of the receiving units 20-2 and 21-2 is constituted by a photodiode 8 (receiving means, receiving step) and an amplifying unit 9. Further, each of the control units 20-3 and 21-3 is constituted by a photodiode 4 (second detecting step), APC 5 (signal level controlling means, signal level controlling step), a peak hold unit 31, a differential amplifying unit 33 (signal level detecting means, signal level detecting step), a comparing unit 36 and a selector 38.

LD 1 emits a laser beam having an intensity in correspondence with an amplitude of a signal outputted from the LD drive unit 2 and transmits information to other optical communication apparatus that is a counterpart of communication via an optical fiber, not illustrated. The LD drive unit 2 drives LD 1 in response to transmitted data (Tx. Data) inputted via a signal line 3 and a signal outputted from APC 5.

A portion of the laser beam emitted from LD 1 is incident on the photodiode 4 and the photodiode 4 photoelectrically converts the incident laser beam and outputs an electric signal in accordance with the intensity of the laser beam. APC 5 controls the LD drive unit 2 via a signal line 7 by inputting an electric signal outputted from the photodiode 4 and an output signal from the selector 38 and in response to these signals.

A laser beam transmitted via an optical fiber, not illustrated, from other optical communication apparatus is incident on the photodiode 8 and the photodiode 8 outputs a corresponding electric signal by photoelectrically converting the laser beam. The amplifying unit 9 amplifies a signal outputted from the photodiode 8 with a predetermined gain, outputs the amplified signal as received data (Rx. Data) via a signal line 10 and outputs it via a signal line 30 to the peak hold unit 31.

The peak hold unit 31 holds a peak value of the signal outputted from the amplifying unit 9 for a predetermined period of time and outputs the peak value to the differential amplifying unit 33 and the comparing unit 36 via a signal line 34.

The differential amplifying unit 33 compares a reference level (Rx. Ref (hereinafter, abbreviated as reference level)) of a received signal inputted via a signal line 32, with a signal inputted from the peak hold unit 31 (a signal in correspondence with a peak level of a laser beam currently received) and supplies a result of comparison via a signal line 39 to the selector 38. Further, the comparing unit 36 compares the output signal from the peak hold unit 31 with a zero level of the received signal (Rx. Zero (hereinafter, abbreviated as zero level)) that is inputted via a signal line 35 and outputs a result of comparison via a signal line 37 to the selector 38.

The selector 38 selects either of a stand-by level (Tx. Stand-by) signal inputted via a signal line 40 and an output signal from the differential amplifying unit 33 in accordance with the state of the output signal from the comparing unit 36 and supplies a selected signal via a signal line 41 to APC 5.

Next, an explanation will be given of the operation of the embodiment.

Incidentally, the optical communication apparatuses 20 and 21 are provided with similar constitutions and therefore, only the optical communication apparatus 20 will be described in the following explanation.

A laser beam transmitted via the optical fiber 22-2 from the counterpart of communication (optical communication apparatus 21), is received by the photodiode 8 and is converted into an electric signal by photoelectric conversion. The output signal from the photodiode 8 is outputted as received data via the signal line 10 and inputted to the peak hold unit 31 after having been amplified by the amplifying unit 9 with a predetermined gain.

The peak hold unit 31 detects a peak value of the signal outputted from the amplifying unit 9 and supplies the peak value to the differential amplifying unit 33 and the comparing unit 36 after holding the peak value for a constant period of time.

The differential amplifying unit 33 calculates a difference between the reference level (Rx. Ref) inputted via the signal line 32 and the output signal from the peak hold unit 31 (a signal in correspondence with a peak level of the received laser beam) and outputs a signal in correspondence with the difference via the signal line 39 to the selector 38. That is, when the signal corresponding to the peak level of the received laser beam is larger than the reference level, the differential amplifying unit 33 decreases a value of a signal which is currently being outputted and conversely, when the peak level of the received laser beam is smaller than the reference level, the differential amplifying unit 33 increases the value of the signal which is currently being outputted.

Further, the comparing unit 36 compares the signal outputted from the peak hold unit 31 with the zero level (Rx. Zero) inputted via the signal line 35. As a result, when the signal outputted from the peak hold unit 31 is larger than the zero level, the comparing unit 36 outputs a signal having a positive value to the selector 38. Also, when the signal outputted from the peak hold unit 31 is smaller than or equal to the zero level, the comparing unit 36 outputs a signal having a negative value to the selector 38.

When the signal outputted from the comparing unit 36 is provided with a positive value (when the signal outputted from the peak hold unit 31 is larger than the zero level), the selector 38 selects the signal outputted from the differential amplifying unit 33 and outputs the signal via the signal line 41 to APC 5. Also, when the signal outputted from the comparing unit 36 is provided with a negative value (when the signal outputted from the peak hold unit 31 is smaller than or equal to the zero level), the selector 38 selects a signal at the stand-by level (Tx. Stand-by) that is inputted via the signal line 40 and supplies the signal via the signal line 41 to APC 5.

Accordingly, when the signal corresponding to the peak level of the received laser beam is larger than the zero level (when a laser beam having a predetermined intensity is emitted from the transmitting unit 21-1), the selector 38 selects the signal outputted from the differential amplifying unit 33 and outputs the selected signal to APC 5. Further, when the signal corresponding to the peak level of the received laser beam is smaller than or equal to the zero level (when the optical fibers 22-1 and 22-2 are not connected, or a power source of the transmitting unit 21-1 is not turned on), the selector 38 selects the signal at the stand-by level and outputs the selected signal to APC 5.

APC 5 controls the LD drive unit 2 such that the signal outputted from the photodiode 4 and the signal outputted from the selector 38 establish a predetermined relationship (for example, the both signals have the same value).

As a result, when a laser beam is not transmitted from the optical communication apparatus 21 that is a counterpart of communication (when the optical fibers 22-1 and 22-2 are not connected, or when the power source of the optical communication apparatus 21 is not turned on), a laser beam having an intensity in correspondence with the stand-by level (hereinafter, abbreviated as stand-by intensity) is emitted from LD 1.

Further, when a laser beam is transmitted from the optical communication apparatus 21, a laser beam having an intensity which is determined in accordance with the signal outputted from the differential amplifying unit 33 (a signal outputted in correspondence with the difference between the signal corresponding to the peak level of the received laser beam and the reference level) is outputted. Accordingly, when the signal corresponding to the peak level of the received laser beam (an output signal from the peak hold unit 31) is smaller than the reference level, the intensity of the laser beam emitted from LD 1 is increased and conversely, when the signal corresponding to the peak level of the laser beam is larger than the reference level, the intensity of the laser beam emitted from LD 1 is decreased.

FIG. 3 is a diagram showing a relationship between an intensity of a laser beam received by the optical communication apparatus shown by FIG. 2 (hereinafter, abbreviated as received laser beam) and an intensity of a laser beam transmitted thereby (hereinafter, abbreviated as transmitted laser beam). As shown by the diagram, when the intensity of the received laser beam is smaller than and equal to the zero level (Rx. Zero), the intensity of the transmitted laser beam is changed to the stand-by intensity. When the intensity of the received laser beam is larger than the zero level, after holding a maximum transmitting intensity for a constant period, the intensity of the transmitted laser beam is decreased with an increase in the intensity of the received laser beam.

Incidentally, the maximum transmitting intensity may be limited to protect LD 1 or the photodiode 8.

Next, an explanation will be given of the operation when the power source of the embodiment is turned on in reference to FIG. 4.

FIG. 4 is a flowchart showing a flow of processings when the power source is turned on in the embodiment shown by FIG. 2. The processings are carried out when the power source is turned on in the optical communication apparatuses 20 and 21.

Incidentally, the optical communication apparatuses 20 and 21 are provided with the similar constitutions and therefore, only the operation of the optical communication apparatus 20 will be described in the following explanation as in the case described above.

When the power source is turned on at the optical communication apparatus 20, the transmitting unit 20-1 transmits a laser beam having the stand-by intensity via the optical fiber 22-1 (step S1).

That is, when the power source is turned on at the optical communication apparatus 20 in the case where the power source is not turned on at the optical communication apparatus 21 that is a counterpart of communication, a signal outputted from the peak hold unit 31 is smaller than the zero level and accordingly, the comparing unit 36 outputs a signal having a negative value to the selector 38. Then, the selector 38 selects a signal at the stand-by level that is inputted via the signal line 40 and outputs the selected signal to APC 5. As a result, LD 1 outputs a laser beam having the stand-by intensity.

Next, the photodiode 8 receives a laser beam transmitted via the optical fiber 22-2 and outputs it to the amplifying unit 9 after photoelectric conversion (step 52). The comparing unit 36 determines whether the laser beam is received by comparing the output signal from the peak hold unit 31 with the zero level (step S3).

As a result, when the laser beam is received (when the signal outputted from the peak hold unit 31 is larger than the zero level or when the answer is YES at step S3), the operation proceeds to step S4. That is, when a signal having a positive value is outputted from the comparing unit 36, the selector 38 supplies the signal outputted from the differential amplifying unit 33 to APC 5. As a result, the intensity of the laser beam emitted from LD 1 becomes an intensity in correspondence with the signal outputted from the differential amplifying unit 33.

Further, when the laser beam is not received (when the signal outputted from the peak hold unit 31 is smaller than or equal to the zero level, or when the answer is NO at step S3), the operation returns to step S1 and repeats similar processings. That is, when the signal outputted from the peak hold unit 31 is smaller than the zero level, the comparing unit 36 outputs a signal having a negative value and the selector 38 selects a signal at the stand-by level and supplies the selected signal to APC 5. As a result, LD 1 emits a laser beam having the stand-by intensity.

At step S4, the level of the received signal (output signal from the peak hold unit 31) is compared with the reference level. That is, the differential amplifying unit 33 compares the signal outputted from the peak hold unit 31 with the reference level inputted via the signal line 32. As a result, when the level of the received signal is larger than the reference level (when it is determined as (1) at step S4), a signal which is currently being outputted is decreased by a predetermined value and the signal is supplied to the selector 38. As a result, the intensity of the laser beam outputted from LD 1 is decreased (step S5). Further, the operation returns to step S2 and repeats similar processings.

Further, when the level of the received signal is equal to the reference level (when it is determined as (2) at step S4), the value of the signal outputted from the differential amplifying unit 33 remains unchanged and as a result, APC 5 controls the LD drive unit 2 and holds the intensity of the laser beam emitted from LD 1. Further, the operation returns to step S2 and repeats similar processings.

Also, when the level of the received signal is smaller than the level of the reference signal (when it is determined as (3) at step S4), the differential amplifying unit 33 increases the signal that is currently being outputted by a predetermined value and supplies the signal to the selector 38. As a result, APC 5 controls the LD drive unit 2 and increases the intensity of the laser beam outputted from LD 1 (step S6). Further, the operation returns to step S2 and repeats similar processings.

According to the above-described processings, when the laser beam is not received, the laser beam having the stand-by intensity is outputted and when the laser beam is received, the intensity of the laser beam outputted from LD 1 is controlled in accordance with the intensity of the laser beam transmitted from the counterpart and therefore, the laser beam having an intensity in compliance with the transmission losses of the optical fibers 22-1 and 22-2 which are currently connected, can be transmitted.

For example, when the stand-by intensity is determined in consideration of Eye Safe level, even if the power source is turned on in the case where the optical fibers 22-1 and 22-2 are not connected, the retina or the like can be prevented from being injured by a laser beam emitted to the surrounding.

As described above, when the laser beam is received and the received signal is smaller than the reference level, the intensity of the laser beam outputted from LD 1 is increased. When the received signal is larger than the reference level, the intensity of the laser beam outputted from LD 1 is increased. Further, the optical communication apparatuses 20 and 21 are provided with similar constitutions and further, the optical fibers 22-1 and 22-2 are provided with the same length (the respective losses are equal to each other) and accordingly, when a processing of increasing the intensity of the laser beam is carried out in one of the optical communication apparatuses, a similar processing is carried out in the other thereof. Accordingly, as a result of such processings, the intensities of laser beams outputted from both of the optical communication apparatuses are provided with the same degree.

FIGS. 5A and 5B show an example of changes over time of the intensity of a received laser beam and the intensity of a transmitted laser beam when various optical fibers are connected to the embodiment shown by FIG. 2.

FIG. 5A is a diagram showing a change over time of the intensity of a transmitted laser beam. Further, FIG. 5B is a diagram showing a change over time of the intensity of a received laser beam.

Now, assume that the optical communication apparatuses 20 and 21 are connected by the optical fibers 22-1 and 22-2 having a predetermined length and a power source of the optical communication apparatus 20 is turned on at time t1. At this moment, a power source of the optical communication apparatus 21 is not yet turned on and therefore, the intensity of a laser beam emitted from LD 1 is set to the stand-by intensity.

When the power source of the optical communication apparatus 21 is turned on at time t2, the optical communication apparatus 21 receives the laser beam having the stand-by intensity which has been transmitted from the optical communication apparatus 20. As a result, the optical communication apparatus 21 starts receiving the laser beam having the stand-by intensity at time t3.

The optical communication apparatus 20 which has received the laser beam having the stand-by intensity from the optical communication apparatus 21 at time t3, changes the connection of the selector 38 to the side of the differential amplifying unit 33. As a result, a signal in accordance with a difference between the intensity of the received laser beam and the reference level is outputted from the differential amplifying unit 33 and APC 5 controls the LD drive unit 2 in accordance with an output from the differential amplifying unit 33. As illustrated by FIG. 5B, the intensity of the received laser beam is lower than the reference intensity (intensity corresponding to Rx. Ref) at time t3 and therefore, the intensity of the laser beam emitted from LD 1 is increased.

At this moment, similar processings are carried out also in the optical communication apparatus 21 and therefore, the intensity of the laser beam received by the optical communication apparatus 20 is increased at a rate the same as a rate of increasing the intensity of the laser beam emitted by LD 1 of the optical communication apparatus 20. As a result, the optical communication apparatus 20 increases the intensity of the laser beam emitted by LD 1 until the received laser beam becomes equal to the reference intensity. Further, the intensity of the laser beam received by the optical communication apparatus 20 at time t4, is equal to the reference intensity and therefore, the intensity of the laser beam emitted by LD 1 of the optical communication apparatus 20 is fixed to the intensity at time t4. Similar processings are carried out also in the optical communication apparatus 21 and as a result, the intensities of the laser beams emitted from the optical communication apparatuses 20 and 21 are fixed to the same level.

In other words, the optical communication apparatuses 20 and 21 are provided with the similar constitutions and further, the optical fibers 22-1 and 22-2 are provided with the same length (transmission losses are the same) and therefore, the intensities of the laser beams emitted from the optical communication apparatuses 20 and 21 are substantially equal to each other. That is, the optical communication apparatus 20 controls the intensity of the transmitted laser beam in reference to the intensity of the laser beam transmitted from the optical communication apparatus 21. The same is applicable also to the optical communication apparatus 21.

Referring back to FIGS. 5A and 5B, assume that the optical fibers are disconnected at time t5. Then, according to the optical communication apparatus 20, the output from the peak hold unit 31 becomes "0" and as a result, the selector 38 inputs a signal at the stand-by level that is inputted from the signal line 40 and supplies it to APC 5 and therefore, a laser beam having the stand-by intensity is outputted from LD 1 (time t6). Similar processings are carried out also at the optical communication apparatus 21 and the output of the laser beam emitted from the optical communication apparatus 21 is similarly set to the stand-by intensity.

Next, assume that optical fibers 22-1 and 22-2 having longer lengths than before are connected at time t8. Then, processings similar to those in the above-described case are carried out in the optical communication apparatuses 20 and 21 and as a result, the intensities of the laser beams received by the respective optical communication apparatuses 20 and 21 become equal to the reference intensity (time t10). In this case, the lengths of the optical fibers 22-1 and 22-2 are longer than before and therefore, transmission losses are increased by that amount. Accordingly, as shown by FIG. 5A, the intensity of the transmitted laser beam becomes increased compared with the case where short optical fibers are connected.

Successively, assume that the optical fiber is disconnected at time t11 and a longer optical fiber is connected at time t13. When the optical fibers are disconnected, the intensities of the laser beams emitted from the optical communication apparatuses 20 and 21 become the stand-by intensity. Further, when optical fibers having a length further longer than before are connected at time t13, although the intensity of the received laser beam is temporarily increased, the increase is stopped at time t14. That is, the optical fiber connected at this occasion is provided with a very large transmission loss and therefore, the intensity of the received laser beam does not exceed the reference intensity and as a result, the intensity of the laser beam emitted from LD 1 is set to the stand-by intensity.

According to the above-described embodiments, the intensities of the laser beams are mutually controlled via the optical fibers whereby even if the transmission losses are changed, laser beams having a constant intensity can always be received. Also, when the optical fibers are not connected, a laser beam having the stand-by intensity is emitted and accordingly, the problem of Eye Safe can be cleared by pertinently setting the stand-by intensity.

When the system is considered as a whole, LD 1 of each of the communication apparatuses outputs a laser beam having an intensity in accordance with a transmission loss of connected optical fibers and therefore, compared with the conventional case where the intensity is set to be in correspondence with a portion in a system having the largest loss, when the system is viewed as a whole, the life of LD 1 can be prolonged.

Also, in respect of a portion in a system having a relatively large loss (optical communication apparatuses to which long optical fibers are connected), a countermeasure can be dealt with such as using LD 1 having a long life.

FIG. 6 is a block diagram showing other electric constitution of an optical communication apparatus to which the present invention is applied. Incidentally, the same notations are attached to portions in FIG. 6 the same as those in FIG. 2 and therefore, an explanation thereof will be omitted.

According to the embodiment, a photodiode 4 and APC 5 are excluded and the differential amplifying unit 33 is replaced by a comparing unit 60. The other constitutions are the same as those in the case of FIG. 2.

Next, a simple explanation will be given of the operation of the embodiment.

A laser beam transmitted through an optical fiber, not illustrated, is photoelectrically converted into a corresponding electric signal by the photodiode 8. An electric signal outputted from the photodiode 8 is amplified by the amplifying unit 9 with a predetermined gain and thereafter, outputted as received data (Rx. Data) via the signal line 10 and outputted to the peak hold unit 31 via the signal line 30.

The peak hold unit 31 holds a peak value of a signal outputted from the amplifying unit 9 for a predetermined period of time and supplies it to the comparing units 36 and 60 via the signal line 34. The comparing unit 36 compares the signal outputted from the peak hold unit 31 with the zero level (Rx. Zero) inputted via the signal line 35 and outputs a signal having a positive value to the selector 38 when the signal outputted from the peak hold unit 31 is larger than the zero level. Further, when the signal outputted from the peak hold unit 31 is smaller than or equal to the zero level, a signal having a negative value is supplied to the selector 38.

The comparing unit 60 compares the signal outputted from the peak hold unit 31 with the reference level inputted via the signal line 32. As a result, when the signal outputted from the peak hold unit 31 is larger than the reference level, the comparing unit 60 decreases the output signal and conversely, the comparing unit 60 increases the output signal when the signal outputted from the peak hold unit 31 is smaller than the reference level.

When a signal outputted from the comparing unit 36 is provided with a negative value (when a value of a signal outputted from the peak hold unit 31 is smaller than or equal to the zero level), the selector 38 selects the signal at the stand-by level inputted from the signal line 40 and supplies it to the LD drive unit 2. When the signal outputted from the comparing unit 36 is provided with a positive value (when a value of a signal outputted from the peak holding unit 31 is larger than the zero level), the selector 38 selects a signal outputted from the comparing unit 60 and supplies it to the LD drive unit 2.

The LD drive unit 2 modulates the transmitted data (Tx. Data) inputted via the signal line 3 in accordance with the magnitude of the signal outputted from the selector 38 thereby driving LD 1. As a result, when the intensity of the received laser beam is smaller than the zero level, LD 1 emits a laser beam at the stand-by intensity. Also, when the intensity of the received laser beam is larger than the zero level, LD 1 controls the intensity of the emitted laser beam such that the intensity of the received laser beam becomes the reference level.

According to the above-described constitution, compared with the case of the embodiment of FIG. 2, the photodiode 4 and APC 5 are dispensed with and therefore, the fabrication cost of the apparatuses can be reduced by that amount.

Figure 7:
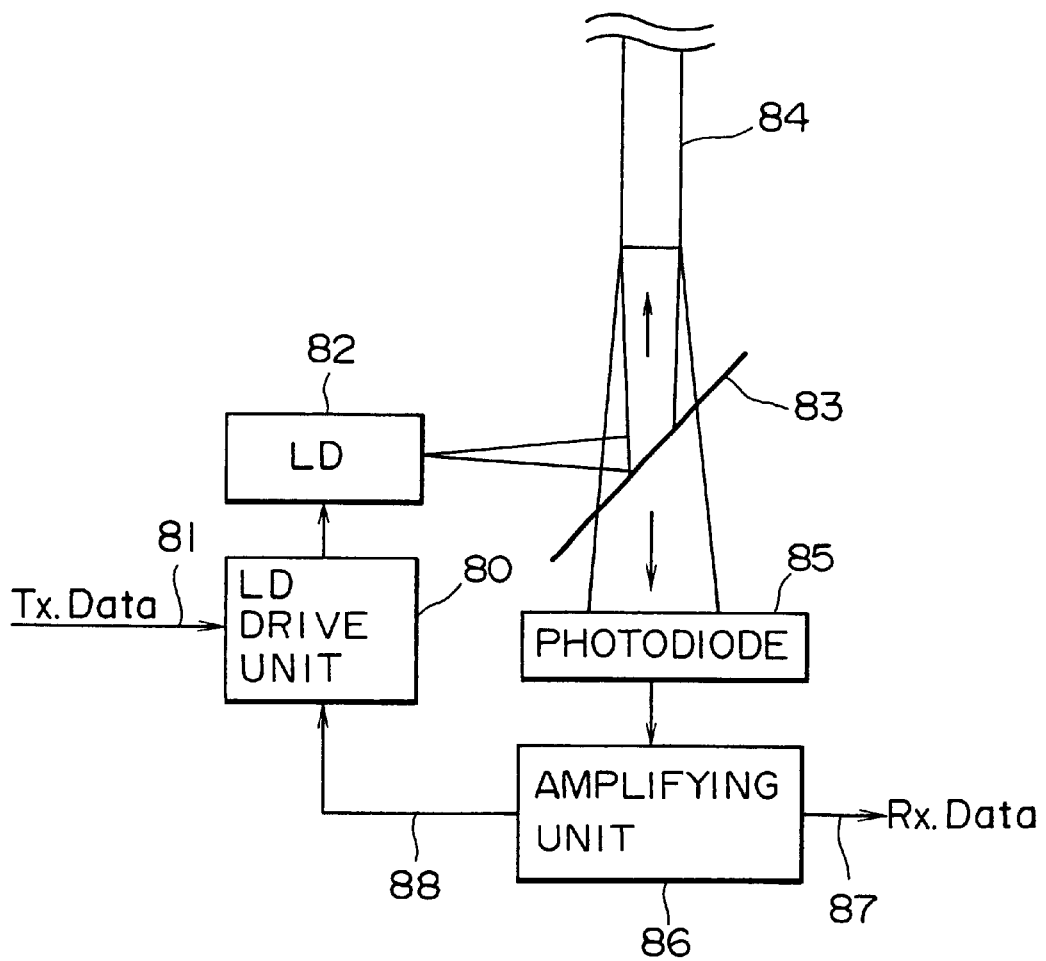
FIG. 7 is a block diagram showing an example of still other electric constitution of an optical communication apparatus to which the present invention is applied.
Figure 8:
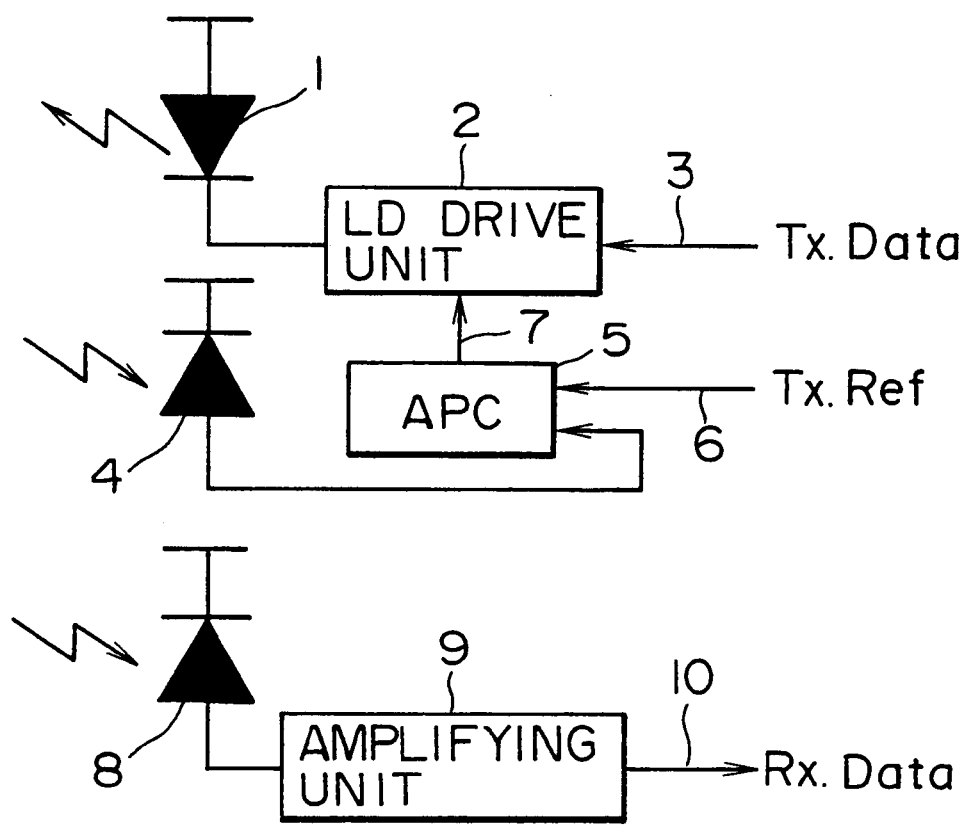
FIG. 8 is a view showing an example of the electric constitution of a conventional optical communication apparatus.

FIG. 7 is a block diagram showing an example of other electric constitution of an optical communication apparatus to which the present invention is applied.

According to the embodiment, information is transmitted and received by using a single optical fiber.

An LD drive unit 80 drives LD 82 by modulating transmitted data (Tx. Data) inputted via a signal line 81 in accordance with a signal outputted from an amplifying unit 86. LD 82 emits a laser beam in accordance with the signal outputted from the LD drive unit 80. A beam splitter 83 reflects the laser beam emitted from LD 82 and makes the laser beam incident on an optical fiber 84 and further, transmits a laser beam transmitted from the optical fiber 84 and makes the laser beam incident on a photodiode 85.

The photodiode 85 photoelectrically converts the laser beam which has been transmitted, into a corresponding electric signal and outputs it to the amplifying unit 86. The amplifying unit 86 amplifies the electric signal outputted from the photodiode 85 with a predetermined gain and outputs it as received data (Rx. Data) via a signal line 87 and also outputs to the LD drive unit 80 via a signal line 88.

Next, a simple explanation will be given of the operation of the embodiment.

The laser beam transmitted via the optical fiber 84 is made to transmit through the beam splitter 83 and is incident on the photodiode 85. The photodiode 85 photoelectrically converts the incident laser beam and outputs a corresponding electric signal.

The amplifying unit 86 amplifies the signal outputted from the photodiode 85 with a predetermined gain and outputs it as received data via the signal line 87 and also outputs it to the LD drive unit 80 via the signal line 88.

The LD drive unit 80 modulates an amplitude of the transmitted data inputted via the signal line 81 in accordance with the signal supplied from the amplifying unit 86 and drives LD 82 in accordance with the obtained signal. That is, when the output signal from the amplifying unit 86 is smaller than a predetermined level (reference level), the amplifying unit 86 increases a voltage for driving LD 82 and when the output signal from the amplifying unit 86 is larger than the predetermined level, the amplifying unit 86 decreases the voltage for driving LD 82.

As a result, the intensity of the laser beam outputted from LD 82 is controlled in accordance with the intensity of the laser beam transmitted from an optical communication apparatus that is a counterpart of communication. Similar to the above-described cases, according to the embodiment, the communication apparatus on the side of the counterpart of communication is provided with a constitution the same as that shown by FIG. 7 and accordingly, the output of LD 82 is controlled such that the intensity of the laser beam received by the photodiode 85 (which is equal to the intensity of the laser beam received by the photodiode 85 of the optical communication apparatus on the counterpart side) becomes the predetermined level.

According to the above-described embodiment, information is transmitted and received by a single optical fiber and therefore, transmission losses of a sending path and a returning path become the same as each other. Therefore, it is not necessary to design in consideration of a variation in transmission losses of the sending path and the returning path and therefore, the design can further be simplified. Also, when optical fibers are connected to the respective optical communication apparatuses, the optical fibers are connected simultaneously to the transmitting units and the receiving units and therefore, erroneous operation caused by a shift in timings of connection (shift in timings for connecting the optical fibers to the transmitting units and the receiving units) can be prevented.

Additionally, although according to the above-described embodiments, optical fibers are used as transmitting media and LD is used as a light source, the present invention is not limited to such cases but is applicable to the case where an LED or a light beam emitted from other light source is used.

According to the optical communication apparatus in accordance with the first aspect of the present invention and the optical transmission method in accordance with the second aspect thereof, a signal is transmitted via a transmitting medium to other optical communication apparatus, a signal transmitted via a transmitting medium from the other optical communication apparatus is received, a signal level of the received signal is detected, a signal level of the signal to be transmitted is controlled in accordance with the detected signal level and therefore, a signal at a proper level can be transmitted and received even if the lengths of the transmitting media are changed whereby a probability of causing transmission error can be reduced. Further, even in the case where lengths of the transmitting media are changed, a signal always having a constant intensity is received whereby the design of a circuit at a receiving unit can be simplified.

What is claimed is:

1. An optical signal communication apparatus comprising:
    a transmitter for transmitting a first signal via a transmission medium to an other optical signal communication apparatus;
    a receiver for receiving a second signal transmitted via said transmission medium from said other optical signal communication apparatus;
    a signal level detector for detecting a received signal level of said second signal; and
    a signal level controller for controlling a transmitted signal level of said first signal in response to said received signal level, wherein said signal level controller comprises:
        a first comparing unit configured to compare a reference signal level and said received signal level, and in accordance therewith to output said transmitted signal level;
        a second comparing unit configured to compare a zero signal level and said received signal level, and in accordance therewith to output a selection signal; and
        a selector circuit configured to receive said selection signal, a stand-by signal level and said transmitted signal level, and in accordance therewith to selectively output one of said stand-by signal level and said transmitted signal level according to said selection signal.

2. The optical signal communication apparatus according to claim 1, wherein said transmitted signal and said received signal are each a light of an LED or a laser beam modulated in response to transmitted information.

3. The optical signal communication apparatus according to claim 1, wherein said transmission medium is an optical fiber.

4. The optical signal communication apparatus according to claim 1, wherein said transmission medium is two optical fibers for transmission and receiving.

5. The optical signal communication apparatus according to claim 1, further comprising:
    a second signal level detector for detecting said transmitted signal level;
    wherein said signal level controller controls said transmitted signal level in response to said received signal level and said transmitted signal level.

6. The optical signal communication apparatus according to claim 1, wherein said signal level controller sets up said transmitted signal level to a first predetermined level when said received signal level is lower than a second predetermined level.

7. The optical signal communication apparatus according to claim 6, wherein said first predetermined level is said stand-by level.

8. The optical signal communication apparatus according to claim 1, wherein said signal level controller sets up said transmitted signal level to a third predetermined level when said received signal level is higher than a second predetermined level.

9. The optical signal communication apparatus according to claim 8, wherein said third predetermined level is said reference level.

10. An optical signal communication method comprising the steps of:
    transmitting a first signal via a transmission medium to an other optical signal communication apparatus;
    receiving a second signal transmitted via said transmission medium from said other optical signal communication apparatus;
    detecting a received signal level of said second signal received in said receiving step; and
    controlling a transmitted signal level of said first signal transmitted in said transmitting step in response to said received signal level, wherein said step of controlling comprises:
        comparing a reference signal level and said received signal level, and in accordance therewith outputting said transmitted signal level;
        comparing a zero signal level and said received signal level, and in accordance therewith outputting a selection signal; and
        receiving said selection signal, a stand-by signal level and said transmitted signal level, and in accordance therewith selectively outputting one of said stand-by signal level and said transmitted signal level according to said selection signal.

* * * * *